(12) United States Patent
Games et al.

(10) Patent No.: US 7,362,070 B2
(45) Date of Patent: Apr. 22, 2008

(54) ELECTRIC MOTOR CONTROL SYSTEM INCLUDING POSITION DETERMINATION AND ERROR CORRECTION

(75) Inventors: John E. Games, Granby, CT (US); Howard Simmons, Barkhamstead, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 823 days.

(21) Appl. No.: 10/287,127

(22) Filed: Nov. 4, 2002

(65) Prior Publication Data

US 2004/0085039 A1     May 6, 2004

(51) Int. Cl.
G05B 1/06 (2006.01)
H03D 13/00 (2006.01)

(52) U.S. Cl. .................. 318/605; 318/661; 318/600

(58) Field of Classification Search ............. 318/254, 318/439, 605, 661, 600, 604, 138, 448, 685, 318/696, 700, 701, 720–724
See application file for complete search history.

(56) References Cited

U.S. PATENT DOCUMENTS

| | | | |
|---|---|---|---|
| 3,538,498 A | | 11/1970 | Games et al. |
| 3,568,150 A | | 3/1971 | Games |
| 3,735,391 A | | 5/1973 | Games et al. |
| 3,737,885 A | * | 6/1973 | Hedrick ............... 318/584 |
| 3,789,391 A | | 1/1974 | Brock et al. |
| 3,924,721 A | * | 12/1975 | Reynolds ............... 318/685 |
| 3,997,893 A | | 12/1976 | Games et al. |
| 4,321,516 A | | 3/1982 | Ohtsuka |
| 4,355,305 A | | 10/1982 | Cording et al. |
| 4,604,575 A | * | 8/1986 | Shimizu et al. ............ 318/653 |
| 4,651,068 A | * | 3/1987 | Meshkat-Razavi .......... 318/254 |
| 4,897,583 A | * | 1/1990 | Rees ...................... 318/254 |
| 5,418,439 A | | 5/1995 | Whang |

(Continued)

FOREIGN PATENT DOCUMENTS

EP      0 267 966 A1     5/1988

(Continued)

OTHER PUBLICATIONS

"Induktives modulares Absolutme ssystem," Antriebstechnik, Krausskopf Verlag Fur Wirtschaft GmbH. Mainz, DE, vol. 31, No. 9, Sep. 1, 1992.

(Continued)

Primary Examiner—Lincoln Donovan
Assistant Examiner—Eduardo Colon Santana
(74) Attorney, Agent, or Firm—Carlson, Gaskey & Olds (57) ABSTRACT

A system for controlling an electric motor includes a controller and a position indicator that provides position information regarding at least one motor component to the controller. The controller utilizes phase relationships indicative of the position information to determine the actual position of the component of interest. The phase information in one example is derived from the output of a resolver that provides two output signals corresponding to sin ($\theta$) and cos ($\theta$), where $\theta$ is the angular position. Utilizing the phase relationship simplifies the task of determining accurate position information that is useful to modify motor control signals to compensate for latency when making position determinations, velocity calculations or both. The inventive system makes it possible to use less expensive electronics to arrive at more reliable results.

18 Claims, 6 Drawing Sheets

U.S. PATENT DOCUMENTS

| | | | | |
|---|---|---|---|---|
| 5,430,362 A | * | 7/1995 | Carr et al. | 318/779 |
| 5,461,293 A | * | 10/1995 | Rozman et al. | 318/603 |
| 5,760,562 A | | 6/1998 | Woodland et al. | |
| 5,852,355 A | * | 12/1998 | Turner | 318/701 |
| 5,867,004 A | * | 2/1999 | Drager et al. | 318/701 |
| 6,084,376 A | * | 7/2000 | Piedl et al. | 318/605 |
| 6,100,731 A | * | 8/2000 | Otaka | 327/119 |
| 6,304,014 B1 | * | 10/2001 | England et al. | 310/68 B |
| 6,525,502 B1 | * | 2/2003 | Piedl et al. | 318/605 |

FOREIGN PATENT DOCUMENTS

| | | |
|---|---|---|
| WO | WO 00/14696 | 3/2000 |

OTHER PUBLICATIONS

International Search Report completed Jul. 30, 2004 for International Application No. PCT/US 03/35079.

* cited by examiner

FIG - 9

ELECTRIC MOTOR CONTROL SYSTEM INCLUDING POSITION DETERMINATION AND ERROR CORRECTION

BACKGROUND OF THE INVENTION

This invention generally relates to electric motor control. More particularly, this invention relates to determining the position and rate of selected motor system components and compensating for errors associated with using such determinations in motor control signals especially in the case of high motor speed.

Electric motors are well known and in widespread use. Depending on the needs of a particular application, one of several motor types may be utilized. Each motor type has advantages or benefits for certain applications. Regardless of the motor type chosen, appropriate motor control is required to achieve the intended results.

One important aspect of motor control is providing control signals with proper timing and polarity to achieve the desired motor rotation direction and speed. Typical arrangements include a position indicator such as a resolver that provides "feedback" information to the motor controller for adjusting the control signals as may be needed.

One significant drawback to conventional arrangements is that they rely upon complex computations utilizing the position indicator information. In one example, a microprocessor is programmed to calculate a position based upon a complex relationship between two analog outputs from a resolver. This not only introduces complexity into the system but also requires relatively more expensive electronics. In most situations, simplicity and cost savings are very desirable.

Moreover, conventional techniques typically are not capable of providing the level of accuracy needed for some motor control applications. Various error sources introduce inaccuracies in position and velocity determinations. One source of error is latency associated with the delays between data gathering and signal processing because the motor parts are constantly moving. Latency typically cannot be avoided. Motors that rotate at higher speeds, for example, require even faster signal processing to keep up with the faster changing positions of the motor components in a manner that would avoid the effects of latency.

Other sources of error include a conversion time error that is a function of the time it takes to convert position information into useable form. The conversion time error is most significant when the component of interest transitions between the end of one revolution and the beginning of a subsequent revolution. Other errors are associated with the typically required analog and digital signal processing in motor control systems.

This invention provides a unique solution to the problem of achieving accurate motor control using efficient and reliable position determination and correcting for errors otherwise associated with signal processing. This invention provides the ability to accurately determine position information, velocity information, or both and to compensate for positional computation errors, velocity computation errors or both. The inventive approach provides substantial cost savings as the computational requirements are reduced, which permits the use of less expensive electronics.

SUMMARY OF THE INVENTION

In general terms, this invention is a motor control system that utilizes a phase relationship between two position indicator outputs to determine component position information that is then used to adjust control signals provided to the motor as needed.

One example electric motor system designed according to this invention includes a first motor portion and a second motor portion that rotates relative to the first portion responsive to supplied electrical power. A position indicator associated with the second motor portion provides two outputs indicative of sin ($\theta$) and cos ($\theta$) respectively, where $\theta$ is the angular position of the second motor portion, for example, the rotor. A controller uses a phase relationship between the outputs from the position indicator to determine the actual position of the second motor portion, applies a correction factor to accommodate position error, velocity error or both and controls the supply of electrical power to the motor using the corrected position information.

In one particular embodiment the position information is provided by a resolver. In this example, the resolver outputs (i.e., sin ($\theta$) and cos ($\theta$)) are converted into a phase representation using a full RC bridge (i.e., an RC CR bridge). The zero crossings of the converted resolver outputs are used to determine the position information and the rate information as needed.

One of the unique features of the inventive arrangement is that it obtains a position value from a resolver. In one example, a counter output provides a number indicating the position value.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
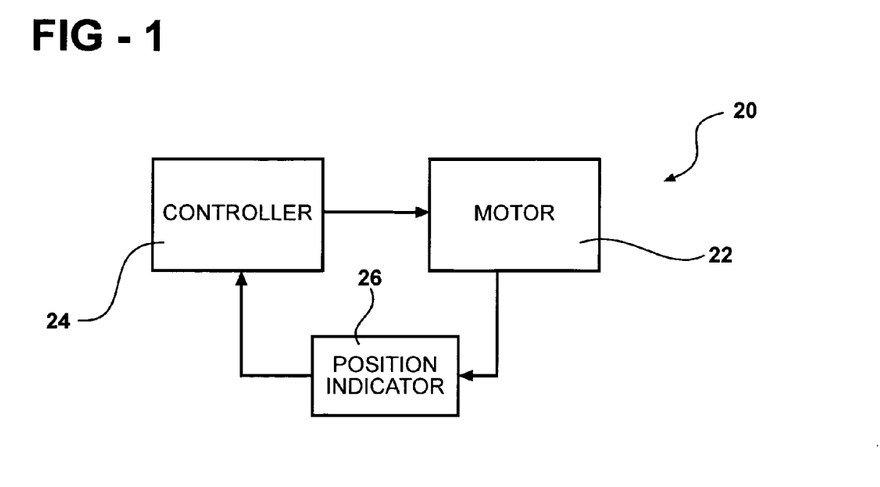
FIG. 1 schematically illustrates a top level system designed according to this invention.

FIG. 1 schematically shows an electric motor control system 20 that includes an electric motor 22 and a controller 24 that provides the necessary power and control signals to the motor to achieve the desired motor operation. A position indicator 26 provides information to the controller regarding the position of at least one component associated with the motor 22 so that the controller can modify the control signals to compensate for any differences between the expected and actual positions of the corresponding component.

Figure 2:
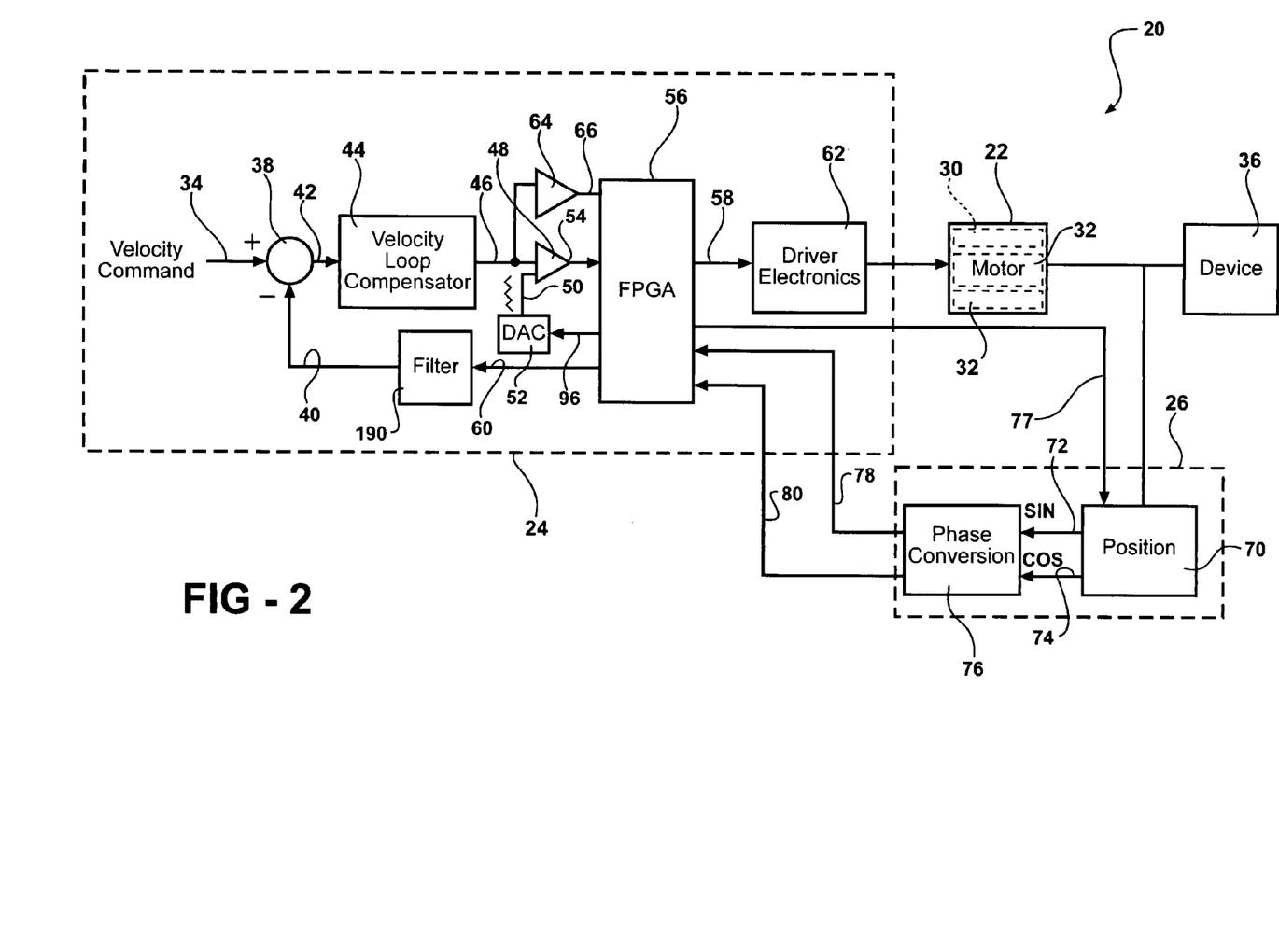
FIG. 2 schematically illustrates, in more detail, one example system consistent with the embodiment of FIG. 1.

In the example of FIG. 2, the motor includes a first portion 30 that is adapted to remain stationary and a second portion 32 that is adapted to rotate relative to the first portion 30. The second portion 32 rotates responsive to control signals from the controller 24 that controls the excitation supplied to the motor 22. Motor control is generally known but the invention provides unique position and velocity determinations with error correction as will be described below.

The system 20 receives a velocity command signal on line 34, which for example may be provided by a control loop (not shown) that operates closed loop on the position of an actuator device 36 driven by the motor 22. The velocity command signal is input to a summer 38 that computes the difference between the commanded velocity and the actual velocity, which is provided by a velocity feedback signal on a line 40. The summer 38 provides an error signal on a line 42 indicative of the error between the commanded and actual velocities. This error signal is input into a velocity loop compensator 44 that provides an analog velocity error signal on a line 46 to a comparator 48. A digital-to-analog converter (DAC) 52 provides a signal on a line 50 to the comparator 48. The output of the DAC 52 on the line 50 in the illustrated example is a triangular wave form that allows the comparator 48 to provide a pulse-width-modulated (PWM) output signal on a line 54. The width of the PWM signal is indicative of the magnitude of the velocity error signal on the line 46.

In the illustrated example the PWM output signal on the line 54 is input to a field programmable gate array (FPGA) 56, which performs position and velocity determination and error compensation as will be described below. The FPGA 56 provides command signals on a line 58 to excite the motor 22. The FPGA 56 also provides a signed motor rotor velocity signal on a line 60 for the analog velocity loop. The command signals on the line 58 are output to a driver circuit 62, which in one example is an H-bridge driver circuit including a plurality of field effect transistors arranged in a known manner, for exciting the motor 22.

The PWM signal on the line 54 contains information indicative of the magnitude of velocity error. The system 20 also includes a comparator 64 that receives the velocity error signal on the line 46 to determine the direction (i.e., the polarity) of the error. When the velocity error signal on the line 46 is positive, the comparator 64 provides a Boolean signal (DIR) on a line 66 that corresponds to a logical ONE. Otherwise, when the velocity error signal on the line 46 is negative, the comparator 64 provides a Boolean signal on the line 46 that is a logical ZERO. Accordingly, the signals on the lines 54 and 66 (PWM and DIR, respectively) together provide magnitude and polarity information indicative of the velocity error on the line 46.

To provide feedback information, the system 20 also includes a motor shaft position resolver 70 that operates in a conventional manner. In one example, the resolver 70 is a 2× speed device. The resolver 70 provides a first output signal on a line 72 and a second output signal on a line 74. The output signals from the resolver 70 are sin (θ) and cos (θ), respectively. The manner in which the resolver 70 provides these outputs is known in the art.

Figure 8:
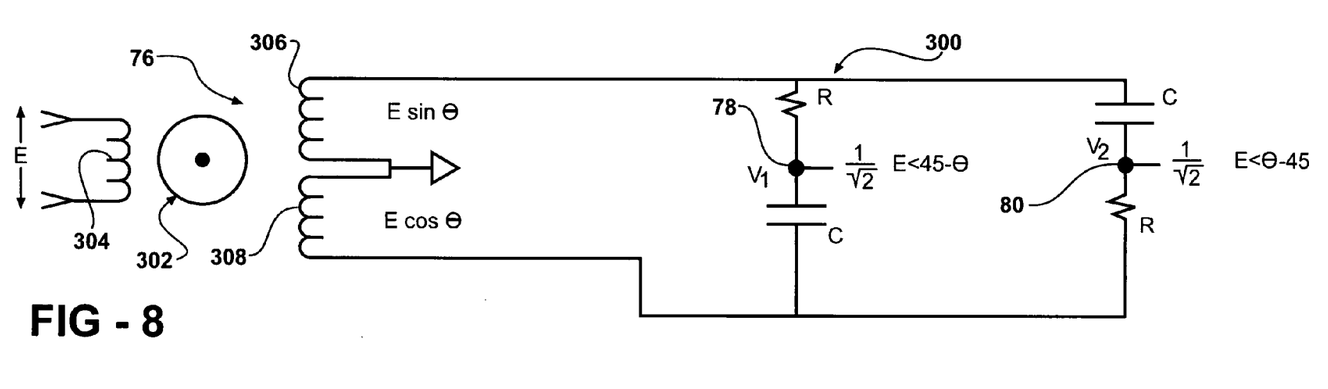
FIG. 8 is a simplified schematic of an example arrangement for processing output signals of a resolver in a system designed according to this invention.

The output signals sin (θ) and cos (θ) are provided to a phase conversion portion 76, which in one example comprises a full RC bridge circuit 300 arranged in a conventional manner as illustrated in FIG. 8. The phase conversion portion 76 effectively converts the output signals from the resolver 70 into phase representations of the angular position of the motor component that the resolver monitors.

Figure 3:
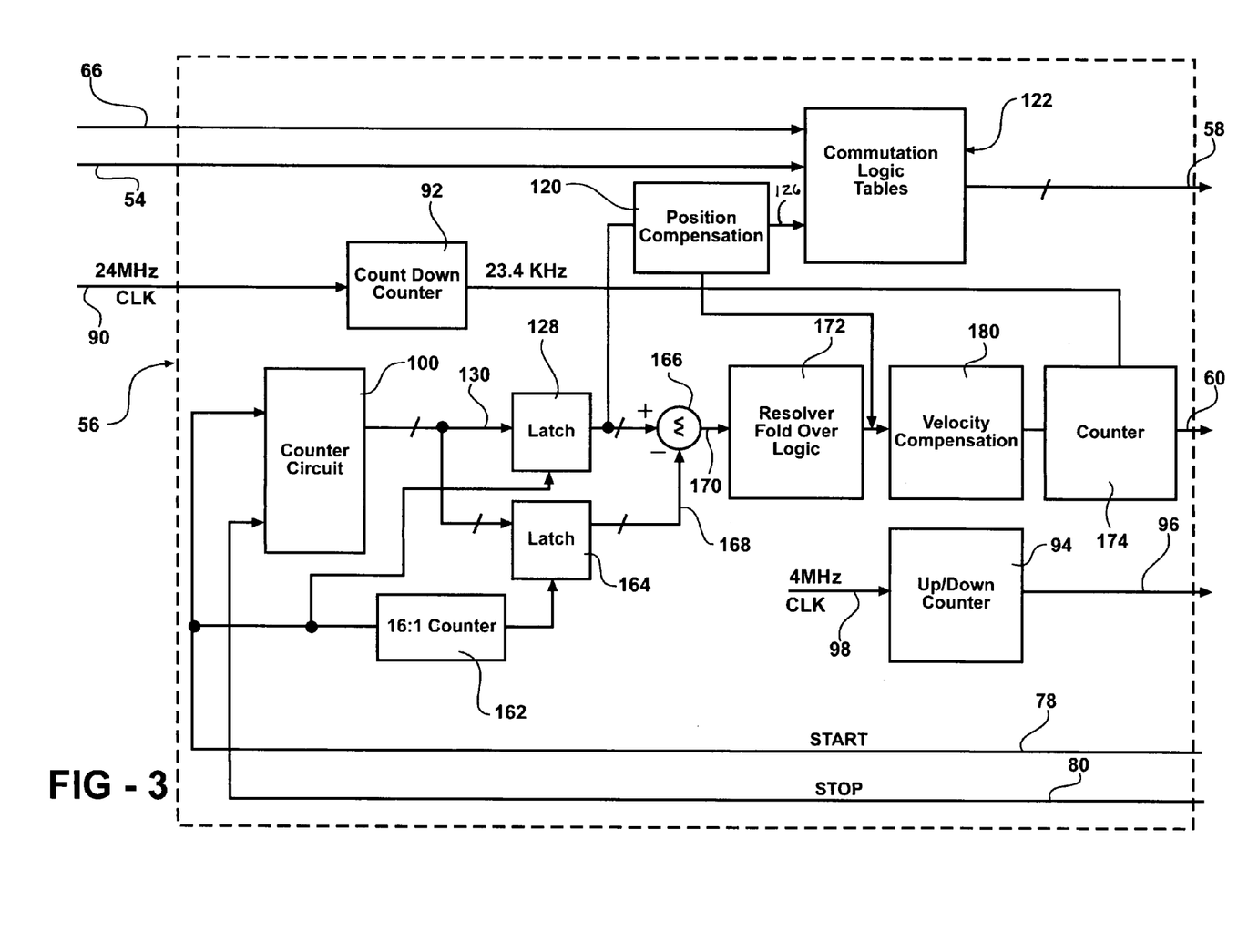
FIG. 3 schematically illustrates, with additional detail, selected portions of an example field programmable gate array designed and programmed according to this invention.

Referring to FIG. 8, the full RC bridge 300 provides outputs $V_1$ and $V_2$, which correspond to signals on the lines 78 and 80, respectively, in FIGS. 2 and 3. As the motor shaft and resolver rotor 302 rotate, a voltage across a primary coil 304 is E=V sin(ωt); where V=peak of sine wave input;

ω=the excitation frequency×2π;

t=time; and θ=the mechanical angle of the rotor with respect to the primary mechanical reference. The voltage across the coil 306 equals E sin θ while the voltage across the coil 308=E cos θ.

The phase difference between the output signals from the resolver, therefore, can be described by the equation $V_2-V_1=(θ-45)-(45-θ)=2\ θ-90$. It should be noted that within the example arrangement of FIG. 8, R=1/(C ω)=1/(C2 π f).

In the example of FIG. 8, the output signals from the phase conversion portion 76 are separated by 2θ— 90°, where θ is the mechanical resolver position in resolver degrees. By mechanically indexing the resolver appropriately, the −90° bias can be removed, thereby accommodating a direct 2θ electrical to mechanical relationship. Such mechanical indexing in combination with a two speed resolver provides a four speed conversion of resolver electrical to motor shaft mechanical position and, when coupled to a four speed motor, provides correct motor speed sensing. The four speed motor 22 in this example has four pole pairs and the resolver has two pole pairs. In this example, the resolver 70 receives an excitation signal on a line 77, which is a 23.4375 KHz sine wave with a frequency that is counted down in the FPGA 56 by 1024 from the 24 MHz clock signal on line 90 (see FIG. 3). In this example, the following equivalents apply:

1 motor electrical cycle (360° electrical)=90° motor shaft mechanical=180° resolver electrical; and therefore, 1 resolver cycle (360 resolver degrees)=180° resolver mechanical.

Figure 9:
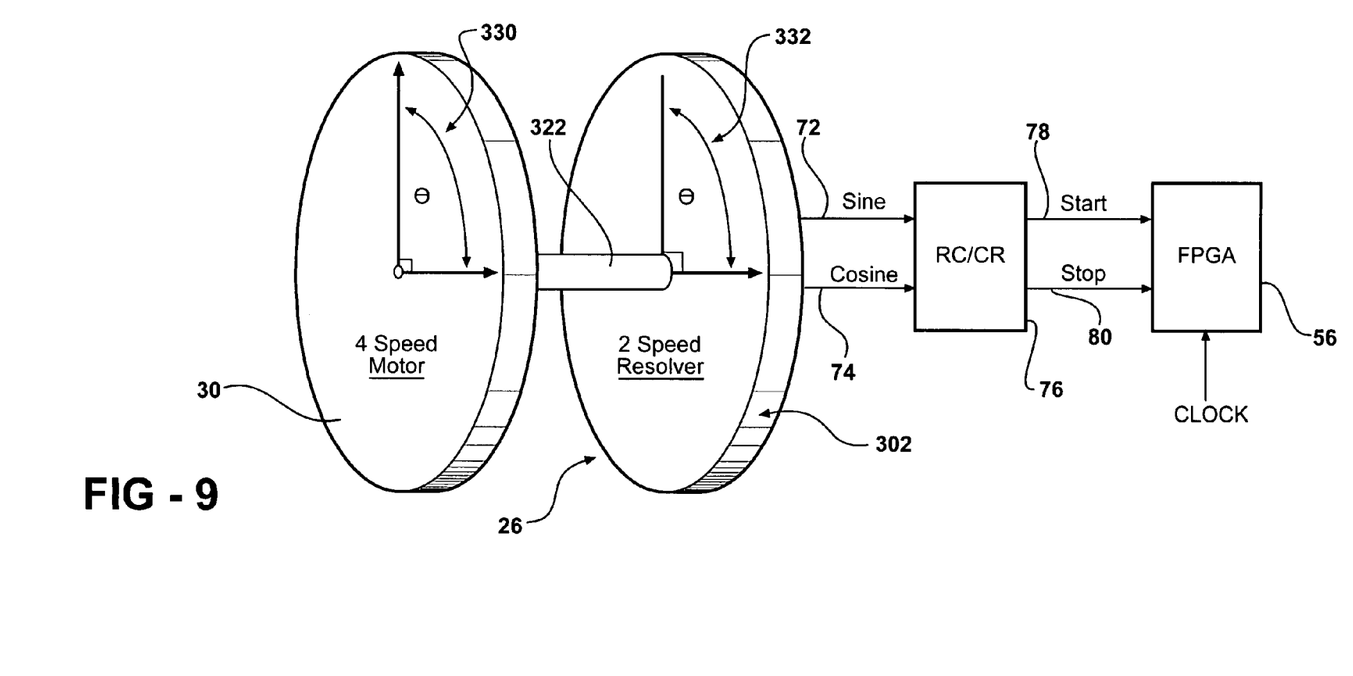
FIG. 9 schematically illustrates relationships between electrical and shaft angles associated with an electric motor and a resolver and their relationships to a computed counts angle in an example embodiment of this invention.

These relationships can be appreciated from the schematic illustration of FIG. 9 where an output 320 of the four pole motor 22 is coupled to the resolver rotor 302 by a coupling shaft 322. When θ is 90° motor mechanical as shown at 330, that corresponds to 360° motor electrical. Because of the relationship between the four speed motor and the two speed resolver, θ shown at 332 corresponds to 90° resolver mechanical and 180° resolver electrical.

Referring now to FIGS. 2 and 3, an example FPGA 56 designed according to this invention is shown schematically. The FPGA 56 receives a clock pulse (i.e., 24 MHz) on the line 90. The clock signal in the illustrated example is input to a counter 92 that generates slower clock signals based upon the 24 MHz clock input. In one example, the slower clock signals are 4 MHz and 23.4375 KHz. The FPGA 56 includes an up-down counter 94 (i.e., a 7 bit counter) that continuously cycles between a 100 ascending and descending count (i.e., the counter steps from 0 counts to 100 counts in steps of 1 and then from 100 to 0 in steps of 1, then repeats). The up-down counter 94 provides a count signal on a line 96 to the DAC 52, which generates the triangle wave form provided on the line 50. For example, a 4 MHz clock signal on a line 98 may be used to drive the up-down counter 94, such that a full cycle of 200 steps results in a DAC 52 providing a triangle wave form having a frequency of 20 KHz.

The output from the phase conversion portion 76 is provided on lines 78 and 80 to the FPGA 56. These signals provide phase conversion relationship information to the FPGA 56 that is used to make position, velocity and error correction determinations. The output signals from the phase conversion portion 76 control a counter located within the FPGA that provides an indication of the resolver position (i.e., 2θ).

The FPGA 56 receives the signals on the lines 78 and 80, which control a counter 100. The signals on the lines 78 and 80 are effectively stop and start signals for the counter 100. In one example, the counter 100 operates based upon leading or trailing edges of the output signals on the lines 78 and 80. In one example, the output signal on the line 78 corresponds to the voltage output V1 of the RCCR bridge 300 of FIG. 8. In this example, the zero crossing of the leading edge of the voltage output on the line 78 provides the start signal to the counter 100. In the same example, the output on the line 80 is the voltage V2 of the full RC bridge 300. The trailing edge zero crossing of this signal provides the stop signal to the counter 100 in this example.

In one example, the counter 100 is a 10 bit counter that operates at a 23.4375 KHz rate based upon the zero crossing of the signal edges. For a system having a 4 pole motor and a 2 pole resolver, the start signal on the line 78 is separated from the stop signal on the line 80 by 2θ resolver degrees. The following relationships therefore apply (as shown in FIG. 9):

90° mechanical=180° resolver=360° electrical the resolver excitation period=42.667 microseconds;

therefore update of counter=42.667 microseconds;

the counter is 10 bits (i.e., 1024 states);

the clock is 24 MHz;

and the resolver excitation is 23.4375 KHz derived from the 24 MHz clock.

Based upon these relationships, the commutation granularity in this example is equal to 360°/1024=0.3515625° electrical/count. In addition, for 6 step commutation (i.e., 60° electrical per step), in this embodiment the relationship between counts and steps is 170.6667 counts per step (i.e., 60° electrical/step (0.3515625° electrical/count)). Accordingly, as the resolver 70 rotates with the motor shaft, the angle and the value from the counter 100 changes proportionally.

There are two errors that cause latency for which the inventive system provides compensation. One of the errors is related to the update rate of the counter indicative of position. Because components may be moving in the electric motor assembly, positions of those components will change between updates in resolver excitation. Accordingly, this source of error is proportional to the update rate and rotational velocity.

A second source of error is associated with a time delay between the starting signal for the counter 100 and the stopping signal, which is referred to in this description as a conversion time. As the conversion time between the starting and stopping signals for the counter increases the error increases.

Figure 4:
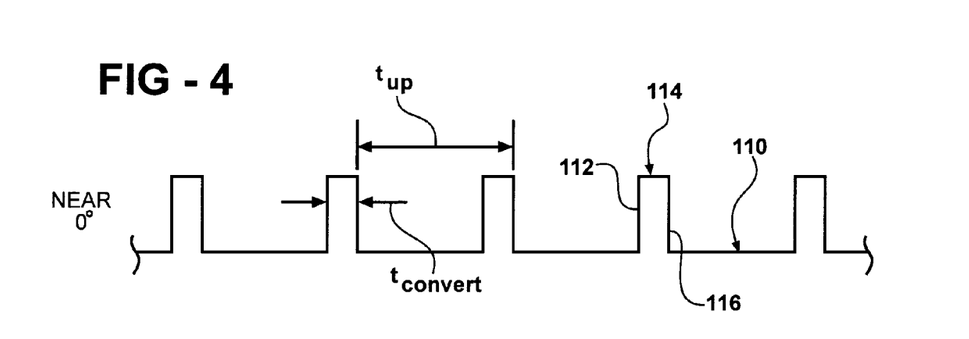
FIG. 4 is a timing diagram showing selected features of signal processing with the example embodiment of FIGS. 2 and 3 near 0°.

FIG. 4 shows a timing diagram illustrating the phase relationship provided by the phase conversion portion 76. The signal trace 110 schematically illustrates superimposed representations of the output signals on the lines 78 and 80. In this example, the leading edge 112 of each pulse 114 serves as the start signal for the counter 100. The trailing edge 116 corresponds to the stop signal indicating that the counter 100 should stop counting to make a position determination. The update rate is shown as $t_{up}$, which remains the same based upon the resolver excitation. In one example, the resolver excitation is at 23.4375 KHz so that an update occurs approximately every 42.667 microseconds. Because the motor components may be moving during those 42.667 microseconds, an error proportional to $t_{up}$ introduces latency.

The time $t_{convert}$ corresponds to the width of each pulse 114 or the time between the rising edge 112 and falling edge 116. This time $t_{convert}$ varies depending upon the position of the motor rotor component which the resolver monitors. The trace 110 in FIG. 4 corresponds to a reading at a position near 0° (i.e., near a beginning of a revolution). In this position, the time $t_{convert}$ is relatively small and so the error introduced during that time is relatively small.

Figure 5:
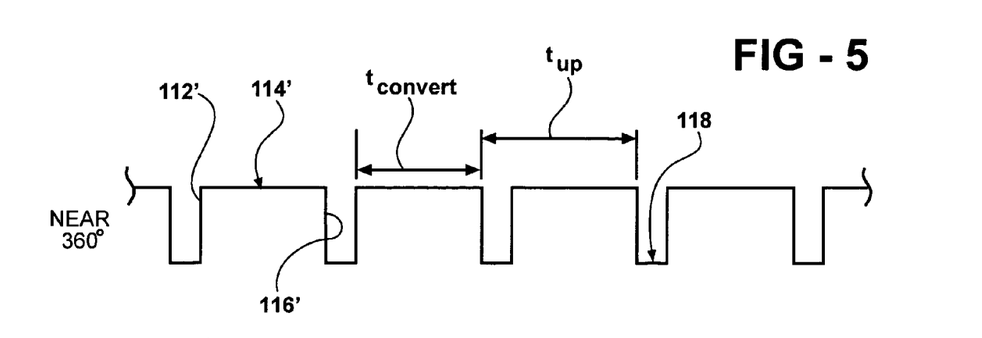
FIG. 5 is a timing diagram similar to that of FIG. 4 under different conditions near 360°.

As the motor component monitored by the resolver continues to move through a revolution, however, the conversion time error increases. FIG. 5 graphically illustrates this phenomena showing a larger $t_{convert}$ between the rising edge 112 and the falling edge 116' of the pulses 114'. The trace 118 schematically illustrates the phase relationship between the two outputs from the phase conversion portion near the end of a complete revolution (i.e., near 360°). As can be appreciated by comparing FIGS. 4 and 5, the $t_{convert}$ time is longer near 360° (FIG. 5) than it is near 0° (FIG. 4). Accordingly, the error introduced by the conversion time varies throughout each revolution.

The error introduced by the conversion time is only due to the latency of the start pulse (i.e., the leading edge 112) since the stop pulse (i.e., the trailing edge 116) is coincident with the counter reading. The effective latency in the conversion time is therefore ½ of the conversion time.

The inventive arrangement includes position compensation 120 that corrects for the latency in making a position determination. The position compensation 120 in one example implementation of this invention determines the position error as:

$$\text{position error} = \text{velocity}(t_{up} + t_{convert}/2).$$

Assuming a 23.4375 KHz resolver excitation, $t_{up}$=42.667 microseconds. The minimum position error=0 at 0° (i.e., the start and stop signals are simultaneous). The maximum position error=max velocity(42.667×1.5×10$^{-6}$) at 360°. The average position error therefore equals max velocity (42.666×1.5×10$^{-6}$)/2=max velocity (32×10$^{-6}$).

Using a 3600 RPM motor max velocity as an example, the mechanical rate=(3600 *RPM*/60 *sec/M*) 360 *deg/R*=21600 mechanical degrees/second.

The electrical rate=4×mechanical rate (2×resolver plus 2×RC/CR bridge)=86400 electrical degrees/sec.

In this example, the average position error is 2.7648 degrees.

Accordingly, the position compensation portion 120 would add or subtract 2.7648 degrees to/from the angular position measurement, depending on the direction of motor rotation.

Figure 7:
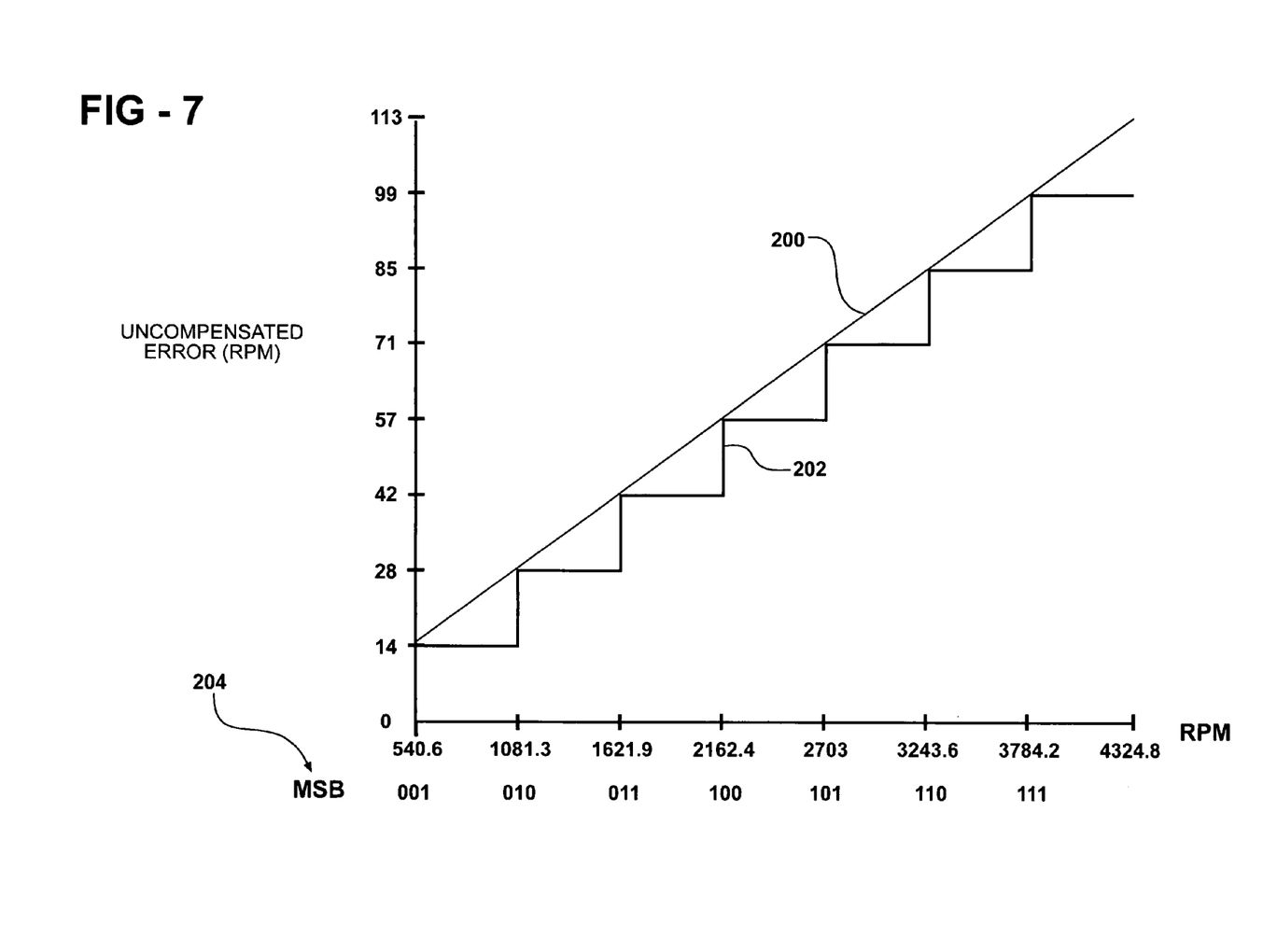
FIG. 7 is a graphical plot showing an example rate compensation as a function of RPM according to one embodiment of this invention.

If more accurate position compensation is needed, a multilevel value can be used as a function of measured velocity, such as that which will be described for velocity compensation, as illustrated in FIG. 7.

The FPGA 56 includes commutation logic tables 122 that provide the output signals on the line 58 to control the motor drive circuit 62. In one example, a three phase brushless DC motor is used and the output signals on the line 58 provides the phase switching information or commutation control for operating the motor. As known in the art, commutation provides energy to cause rotation of the motor in a desired direction at a desired speed. In one example, pulse width modulation is used to control the energy to each commutation pulse.

The commutation logic tables 122 receive a signal indicative of the velocity error polarity (i.e., DIR) on the line 66 and the signal on the line 54 indicative of the magnitude of the velocity error (i.e., PWM). The commutation logic tables 122 also receive a signal on a line 126 indicative of the resolver angle. This signal is provided by a latch 128 that receives a count signal on a line 130 from the counter circuit 100. The resolver angle signal is corrected by using the position compensation 120. The commutation logic tables 122 preferably are designed to achieve the desired motor control to meet the needs of a particular situation. Those skilled in the art who have the benefit of this description will be able to develop specific commutation logic tables to achieve the commutation needed to meet the needs of their particular situation.

In the illustrated example, a counter 162, which is a divide by 16 counter, receives the start signal on the line 78. At every 16$^{th}$ start pulse, the counter 162 clocks a latch 164 to sample the count value on the line 130. As a result, the latch 164 is clocked at 1/16 the rate of the latch 128. In this embodiment, the velocity calculations are updated every 16$^{th}$ position update.

Figure 6:
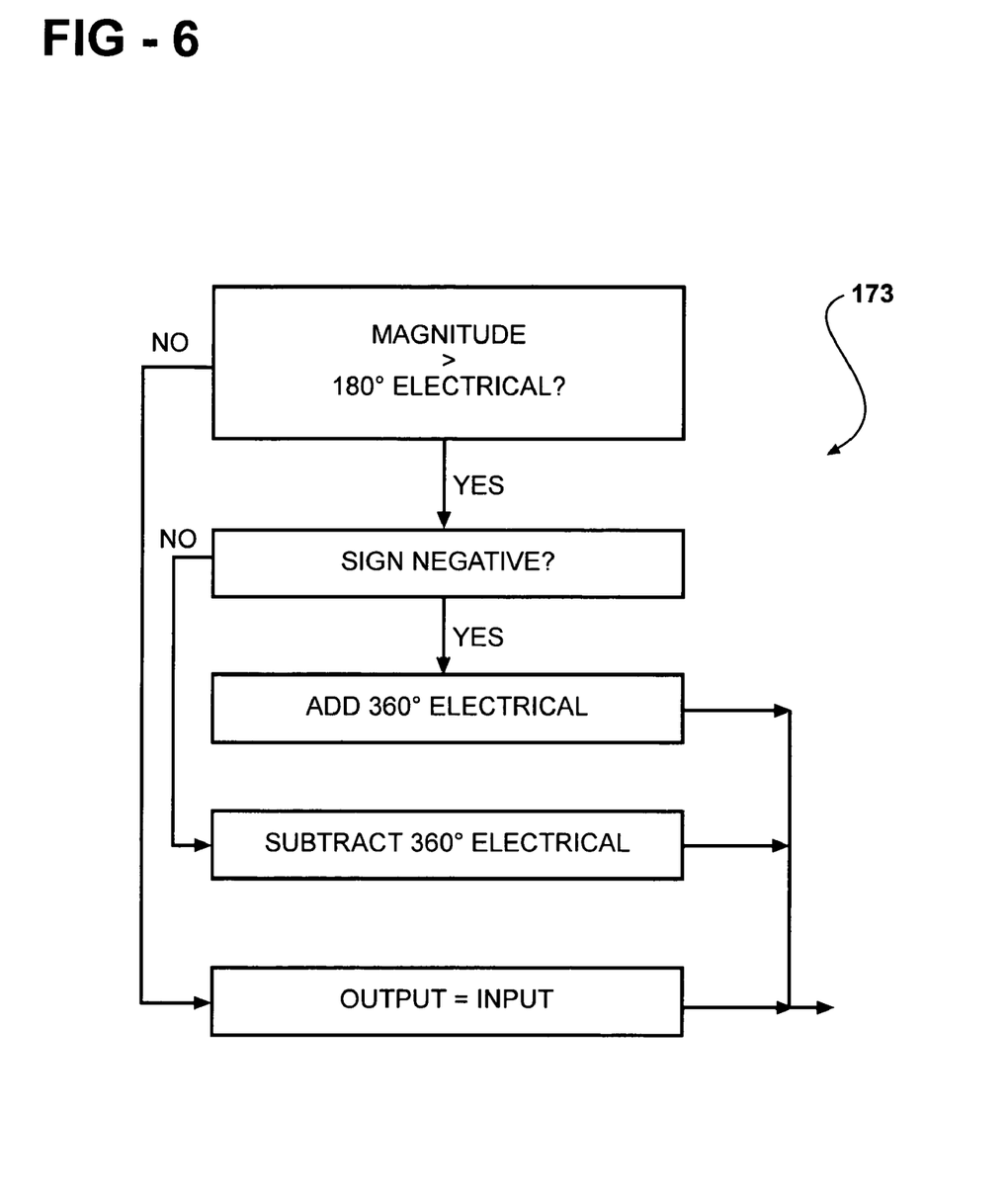
FIG. 6 is a flow chart diagram illustrating an example algorithm for determining position information when crossing over from 360° to 0° used in an example implementation of this invention.

A summer 166 receives the count signal on the line 126 and a count signal on a line 168 from the latch 164. The summer 166 provides a difference output signal at 170 that is input to resolver fold over logic 172. FIG. 6 includes a flow chart diagram 173 that illustrates example resolver fold over logic useful with an embodiment of this invention.

This fold over logic accounts for the resolver position data captured before and after the discontinuity caused when going through 0 degrees. The fold over logic 172 provides an output signal to the velocity compensation 180 and then to a counter 174 that provides a signed PWM output on the line 60 indicative of velocity. In one example, the counter 174 is a 10 bit counter that provides a PWM output between 0 and 5 volts DC. In one example, 0 velocity is represented by a 50% duty cycle in the PWM signal, full scale negative velocity is represented by 0% duty cycle and full scale positive velocity is represented by 100% duty cycle.

The counter 174 preferably also includes overflow protection to insure that if velocity exceeds a certain threshold, then the zero percent or 100% duty cycle is provided, depending on the direction of rotation. Downstream, external bi-polar filtering and offset is provided in the example of FIG. 2 by a filter 190, which provides the signed positive and negative velocity feedback voltage scaling to the summer 38.

The information provided to the counter 174 first is processed by velocity compensation 180, which is included in the FPGA 56. The velocity compensation 180 compensates for the latency errors that affect velocity determinations.

In the inventive arrangement, errors introduced associated with the update rate are virtually constant and therefore can be neglected in determining the velocity error compensation. The error associated with the conversion time varies from 0 to $t_{up}$, effectively causing a variable latency error from 0 to $t_{up}/2$ in position for each measurement.

As an example, consider a motor rotating at 3600 RPM and assume that the first velocity calculation starts at 0 degrees. Assuming the resolver electrical rate is 86400 electrical degrees/sec and the update of the counter is 42.667 microseconds and assuming the counter 162 is 16:1, the position change for the 16$^{th}$ calculation=16×42.667×10$^{-6}$× 86400=58.981478°. The position error at this point must next be determined. At 360° the position error is clearly that caused by a latency of 42.667/2×10$^{-6}$ seconds, since the $t_{convert}$ effectively is the period of resolver excitation. This produces an error at an 86400 electrical degrees/sec input rate of 1.8432° or $$\frac{1.8432}{360} = .0051$$

degrees error per electrical degree. Applying this factor to the above calculation, the error is 58.981478/478× 0.0051=0.30198 degrees. The percentage velocity error from this position error=100×0.30198/ 58.981478=0.511992%.

This invention includes a recognition that errors in calculating the velocity during non-fall off conditions (i.e., not at a transition from one revolution to the next) will be consistent and small for each velocity calculation. The invention also includes the recognition that errors in calculating velocity during fall off conditions (i.e., at a transition from one revolution to the next) will be a single, much larger step in the opposite direction), and provides a highly undesirable once-per-revolution noise.

During fall off, assume the first position calculation is at 360°. The position error for the first calculation=360× 0.0051=1.8431712°, which is the added change during one velocity computation. The position change for the 16$^{th}$ calculation=16×42.666×86400=58.981478°. The position error for the 16$^{th}$ calculation=58.98148× 0.0051=0.3019805°. The percentage velocity error from this position error=100 (0.30198−1.843171)/58.98148=− 2.613008%.

In one embodiment the compensation may be only for the fall off error making it equal to the error during non-fall off operation. The compensation in this example embodiment is 2.61301+0.51199=3.125% of point. This example compensation for velocity error percent of point is the same magnitude but added or subtracted, depending on the direction of rotation of the motor.

Other embodiments may chose to compensate at all angles to eliminate the 0.511992% error described above and those embodiments would also be in the spirit of this invention.

The inventive arrangement represents a significant departure from the conventional techniques for determining position and velocity of electric motor components for several reasons. One is that the inventive arrangement obtains a counter number indicative of position based upon the resolver output. The inventive arrangement utilizes a phase relationship between the output signals of the resolver in a unique manner that simplifies the position determination. With prior arrangements, complicated software or expensive electronics were required. The inventive arrangement allows implementing the solution in a FPGA, which provides cost savings and other benefits.

Because an FPGA is utilized, it may be desirable to avoid doing direct multiplications so that the FPGA design is simpler and more cost effective. Accordingly, one implementation of this invention includes utilizing a staircase add function in place of a multiplication. Because the percentage of point error has been determined as described above, the compensation could be implemented by multiplication. In embodiments utilizing an FPGA, a staircase addition function dependent on the magnitude of the uncompensated velocity preferably is used.

FIG. 7 schematically illustrates an implementation of a staircase addition function. The idealized correction for velocity is shown at 200. The staircase addition function is shown at 202. The values selected for where to implement the next step in the illustrated example are based upon a particular implementation of this invention. The specific values shown may be varied to meet the needs of a given situation. The illustrated arrangement includes the advantageous feature of using the three most significant bits 204 of the uncompensated velocity. In one example, the inventive system manipulates the three least significant bits by looking at the three most significant bits of the uncompensated velocity. This produces the staircase function as schematically shown in FIG. 7. In one example, when the velocity is sufficiently small, no compensation is implemented. If the velocity affects the third most significant bit, then compensation is added.

One advantage of this invention is that a simpler FPGA may be used in place of a microprocessor or other more expensive electronics to implement a multiply. FPGA's are economical alternatives to such devices when the computing power required can be satisfied by an appropriately designed FPGA. The inventive approach makes such a solution possible. This invention introduces cost savings and reduces the size or weight of a motor control assembly, which may be important in aerospace applications, for example. Although this invention provides the ability to avoid the use of a microprocessor, the invention does not preclude the use of such devices or other complex electronics. Those skilled in the art who have the benefit of this description will be able to select the electronics, software or both best suited to meet the needs for a controller in their particular situation.

This invention provides a more reliable and economical way of making position and velocity calculations in an electric motor control assembly. Additionally, this invention provides unique error correction that compensates for a variety of errors.

The preceding description is exemplary rather than limiting. Variations and modifications to the disclosed examples that do not necessarily depart from the basis of this invention may become apparent to those skilled in the art. The scope of legal protection given to this invention is limited only by the following claims.

We claim:

1. An electric motor system, comprising:
   a rotating motor portion that rotates responsive to supplied electrical power;
   a resolver that provides two outputs indicative of an angular position of the rotating motor portion;
   a converter that converts the two resolver outputs into two corresponding voltages; and
   a controller that determines the actual position of the rotating motor portion based upon a relationship between a leading edge of one of the voltages and a trailing edge of the other one of the voltages, determines a position correction factor and a velocity correction factor based upon the relationship, and uses at least one of the correction factors as needed to control the supply of electrical power to the motor.

2. The system of claim 1, wherein the controller comprises a field programmable gate array.

3. The system of claim 1, wherein the controller includes a counter that counts during an interval between the leading and trailing edges of the voltages and wherein the counter count provides an indication of the rotating motor portion position.

4. The system of claim 1, wherein the controller determines a minimum position error value that corresponds to the rotating motor portion near a beginning of a revolution and a maximum position error value that corresponds to the rotating motor portion near a completion of a revolution and wherein the controller determines the position correction factor based upon the average of the maximum and the minimum position error values.

5. The system of claim 4, wherein the controller determines a direction of rotation of the rotating portion and adds or subtracts the position correction factor based upon the direction of rotation.

6. The system of claim 1, wherein the controller determines the velocity correction factor based upon a first position determination and a second position determination separated by a known amount of time and the controller uses the position error at the second position as part of the velocity correction factor determination.

7. The system of claim 1, wherein the controller uses the velocity correction factor only when the rotating portion transitions between the end of one revolution and the beginning of a subsequent revolution.

8. The system of claim 1, wherein the converter comprises an RC/CR circuit.

9. A method of controlling an electric motor having a rotary position indicator device that provides two signals indicative of an angular position of a selected portion of the motor, comprising the steps of:
   determining a phase relationship between the signals from the position indicator;
   determining the actual position of the selected portion of the motor from the determined phase relationship;
   determining a correction factor for correcting at least one of a position or speed of the selected motor portion, using the determined phase relationship; and
   modifying a motor control signal using the correction factor
   including converting the position indicator signals into two voltages and using a leading edge of one of the voltages and a trailing edge of the other one of the voltages to determine the phase relationship.

10. The method of claim 9, wherein the position indicator comprises a resolver and including applying the resolver signals to an RC/CR bridge to obtain the voltages.

11. The method of claim 9, including starting a counter at the leading edge, stopping the counter at the trailing edge and using a resulting counter value as an indication of the angular position.

12. The method of claim 9, including determining when the selected motor portion completes a revolution and applying a velocity correction factor to compensate for a transition between the completion of one revolution and the beginning of a subsequent revolution.

13. The method of claim 9, including determining a minimum position error value that corresponds to the selected motor portion near a beginning of a revolution and a maximum position error value that corresponds to the selected motor portion near a completion of a revolution and determining a position correction factor based upon the average of the maximum and the minimum position error values.

14. The method of claim 13, including determining a direction of rotation of the selected motor portion and adding or subtracting the position correction factor based upon the direction of rotation.

15. The method of claim 9, including determining a velocity correction factor based upon a first position determination and a second position determination separated by a known amount of time.

16. The method of claim 15, including using the velocity correction factor only when the selected motor portion transitions between the end of one revolution and the beginning of a subsequent revolution.

17. An electric motor system, comprising:
a first motor portion;
a second motor portion that rotates relative to the first portion responsive to supplied electrical power;
a position indicator associated with the second motor portion that provides two output signals indicative of an angular position of the second motor portion; and
a controller that uses a phase relationship between the output signals from the position indicator to determine the actual position of the second motor portion and controls the supply of electrical power to the second motor portion responsive to the determined actual position, wherein the controller determines a minimum position error value that corresponds to the second motor portion near a beginning of a revolution and a maximum position error value that corresponds to the second motor portion near a completion of a revolution and wherein the controller determines a position correction factor based upon the average of the maximum and the minimum position error values.

18. The system of claim 17, wherein the controller determines a velocity correction factor based upon a first position determination and a second position determination separated by a known amount of time.

* * * * *